H. LUTZ.
COMBINATION WATCHMAKER'S TOOL.
APPLICATION FILED APR. 1, 1910.
978,317.
Patented Dec. 13, 1910.
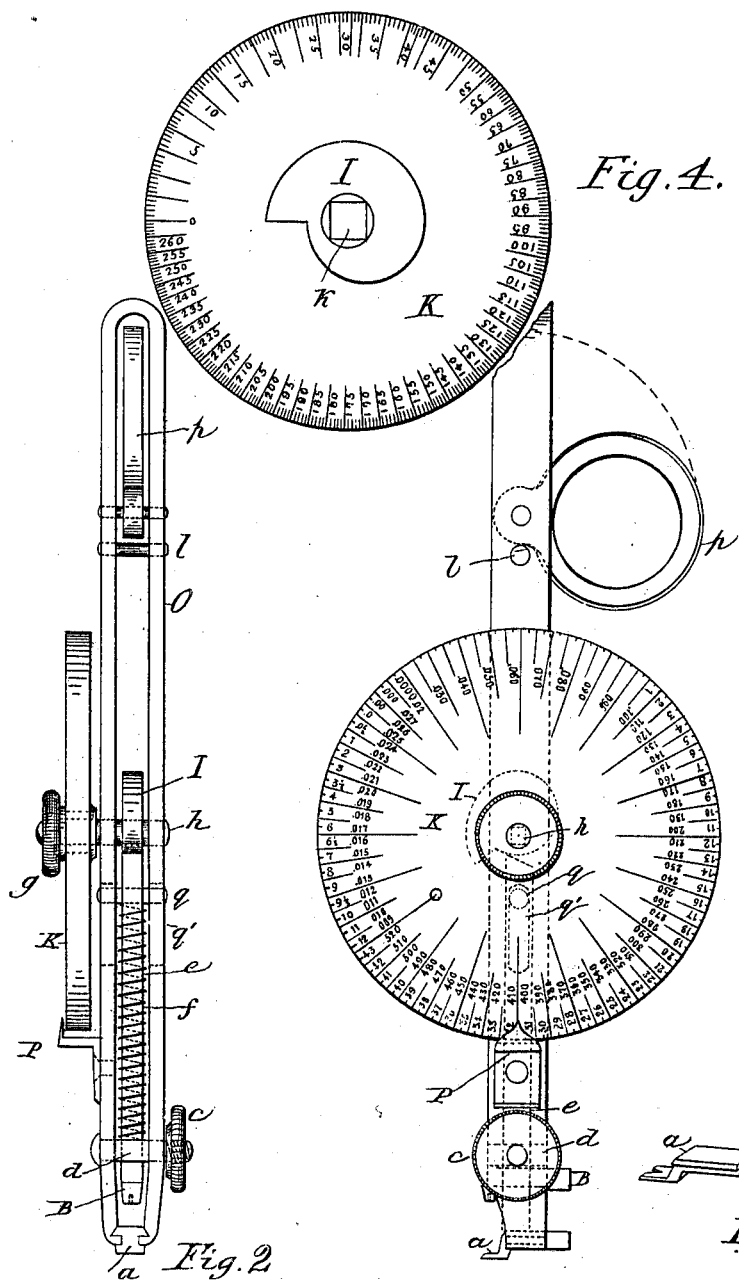
Witnesses.
H. Nicholson,
Jas Gadsby
Inventor
Herbert Lutz,
By Wm Bruce,
Atty.

UNITED STATES PATENT OFFICE.

HERBERT LUTZ, OF HAMILTON, ONTARIO, CANADA, ASSIGNOR OF ONE-FOURTH TO BENJAMIN HARRIS AND ONE-FOURTH TO CHARLES RICHARD FORD, OF HAMILTON, CANADA.

COMBINATION WATCHMAKER'S TOOL.

978,317.  Specification of Letters Patent.  Patented Dec. 13, 1910.

Application filed April 1, 1910. Serial No. 552,767.

*To all whom it may concern:*

Be it known that I, HERBERT LUTZ, a citizen of the Dominion of Canada, residing at Poplar avenue, in the city of Hamilton, in the county of Wentworth, in the Province of Ontario, Canada, have invented a certain new and useful Combination Watchmaker's Tool; and I do hereby declare the following to be a full, clear, and exact description of the construction and operation of the same.

The invention relates to a very handy and convenient combination tool for watchmakers, the uses of which will be for (1) removing rollers, (2) measuring the thickness and width of mainsprings, (3) measuring watch staffs and pivots, (4) a wire gage for measuring or indicating the size of wire. I attain these objects by the mechanism illustrated in the accompanying drawing, in which,—

Figure 1, is a front view of the combination tool embracing my invention. Fig. 2, is a side view of the same. Fig. 3, is a perspective view of the detachable foot or bottom of the tool. Fig. 4, is a plan view of the reverse side of the dial.

Similar letters refer to similar parts throughout the several views.

O, is a metal frame consisting of two parallel bars with a space between them, said frame is made to carry the different parts of the device.

A plunger $e$, is made to operate in the lower end of the space between the sides of the frame, and is supported therein by passing through a block $d$, secured between the sides of the frame the said block having projections which pass through the frame on each side, one projection being screw threaded and has a thumb nut $c$, to tighten the parts together, the upper end of the plunger $e$, has a pin $q$, through it which is held in a slot $q'$, on each side of the frame O. A spiral spring $f$, is made to surround the plunger $e$, between the pin $q$, and the block $d$. A cam , is mounted on a pin $h$, between the sides of the frame and made to impinge on the upper end of the plunger and push its head B, downward to gage the thickness and width of watch mainsprings and gage number of wire. The said block $d$, can be tightened or loosened between the side of the frame O by a thumb nut $c$, on the threaded end of one of the projections of the block which passes through one side of the frame.

The plunger $e$, has a foot B, which projects slightly out from the frame O, and one end of it bent downward as shown in Fig. 1, for greater convenience in operating.

An irregular shaped forked jaw $a$, is dovetailed in the bottom end of the frame, and projects outward at either end as shown at Fig. 1, the forked end of the same is used when removing rollers from balance wheels, and the opposite end for measuring the gage of wire placed between it and the projecting end of the plunger foot B. The said forked jaw $a$, is made purposely dovetailed in the lower end of the frame O, so as when worn out, to be easily removed and replaced by a new jaw.

A measuring index wheel or dial K, is secured on the shaft $h$, and marked or laid out in three rows of measures, one for measuring the thickness of mainsprings one for the width of mainsprings and one for indicating the number and gage of wire, and divided into meters and centimeters.

An index pointer P, is secured to the frame O, and made to pass up a short distance over the index wheel to point to the indicated measurement.

A finger ring $p$, is pivotally attached to the upper frame for convenience in receiving a finger or thumb of the operator when the tool is held in the hand while measuring mainsprings or wire, etc. It is prevented from moving down on the dial K, by a stop pin $l$, fastened in the frame of the tool as shown at Figs. 1, and 2.

The dial K, which is milled on the edge, is held on its square shouldered pin $h$, by a thumb screw $g$, on the said pin's threaded end. By unscrewing the thumb nut $g$, the dial K, can be removed and reversed, the said reverse side being laid out for a jeweler's wire gage, beginning with 5/1000 of an inch up to 250/1000 of an inch advancing in steps of 5, as shown. Thus it will be seen that both sides of the said dial wheel K, can be utilized in fine measurements, in meters, centimeters and the equivalent in Denison's numbers.

Having thus described my device and its advantages, what I claim as my invention and desire to secure by Letters Patent, is

A watchmaker's combination tool structed with a frame, means for holding the frame, the lower end of the frame made adjustable, a removable forked jaw held between the ends of the frame, a plunger formed to operate between the sides of the frame, a cam mounted in the frame to impinge on and operate the plunger, slots in the frame to admit and guide the pins of the plunger at its upper end, a block secured between the sides of the frame near its lower end, the plunger made to pass through the said block, a coiled spring made to surround the plunger between the said block and pin at its top, a projecting foot formed at the lower end of the plunger, means to tighten or loosen the frame, at each side of the said block, a reversible dial measuring plate held on the square end of the cam shaft, and a pointer to indicate on the dial the thickness and width of watch springs when placed between the foot of the plunger and the jaw at the bottom of the frame.

Hamilton, Ontario, March 4th 1910.

HERBERT LUTZ.

Signed in the presence of—
J. WILSON,
WM. BRUCE.